United States Patent [19]

Fleenor et al.

[11] Patent Number: 5,269,105

[45] Date of Patent: Dec. 14, 1993

[54] METHOD OF GENERATING A TORIC SURFACE ON A MOLDING TOOL

[75] Inventors: Richard J. Fleenor, Stafford; Kenneth L. Opdyke, Fairport, both of N.Y.

[73] Assignee: Bausch & Lomb Incorporated, Rochester, N.Y.

[21] Appl. No.: 953,395

[22] Filed: Sep. 29, 1992

[51] Int. Cl.$^5$ .............................................. B24B 1/00
[52] U.S. Cl. ..................... 51/281 R; 51/323
[58] Field of Search ............... 51/281 R, 283, 5 B, 51/5 C, 323; 279/43, 50, 48, 42

[56] References Cited

U.S. PATENT DOCUMENTS

| | | | |
|---|---|---|---|
| 1,558,225 | 10/1925 | Boeker | 279/43 |
| 3,079,737 | 3/1963 | Kratt et al. | 51/217 |
| 3,112,581 | 12/1963 | Hoffman | 51/5 C |
| 3,121,572 | 12/1964 | Torok | 279/50 |
| 3,751,027 | 8/1973 | Giles | 279/43 |
| 4,483,108 | 11/1984 | Howard | 51/283 R |
| 4,680,998 | 7/1987 | Council, Jr. | 82/1 |
| 4,856,234 | 8/1989 | Goins | 51/284 |
| 4,874,314 | 10/1989 | Fleer | 279/43 |
| 5,025,595 | 6/1991 | Orain | 51/217 T |
| 5,110,278 | 5/1992 | Tait et al. | 425/175 |

Primary Examiner—Bruce M. Kisliuk
Assistant Examiner—Bo Bounkong
Attorney, Agent, or Firm—John E. Thomas; Craig E. Larson

[57] ABSTRACT

An improved method for generating a toric surface on a molding tool for forming contact lens molds comprises: providing a tool which comprises an elongated body and a molding portion at one end of the tool, wherein the molding portion comprises a surface which is substantially spherical; applying a force to the elongated body so as to distort the spherical surface of the molding portion; machining a substantially spherical curve in the distorted surface while maintaining the applied force; and releasing the applied force, wherein the spherically cut surface assumes a toric shape upon release of the applied force.

10 Claims, 2 Drawing Sheets

METHOD OF GENERATING A TORIC SURFACE ON A MOLDING TOOL

BACKGROUND OF THE INVENTION

1. Field of the Invention

The present invention relates to a method of generating a toric surface on a molding tool for molding contact lens molds. Additionally, the invention relates to a collet assembly which may be employed in the method.

2. Description of the Related Art

Contact lenses having a toric optical zone (commonly referred to as "toric contact lenses") can be used to correct refractive abnormalities of the eye associated with astigmatism, wherein the toric optical zone provides cylindrical correction for the astigmatism. Since astigmatism is often associated with another refractive abnormality, such as myopia (nearsightedness) or hypermetropia (farsightedness), toric contact lenses are commonly prescribed with a negative or positive spherical correction to correct myopic astigmatism or hypermetropic astigmatism. The optical requirements of a toric contact lens are well known in the art, as discussed in U.S. Pat. No. 4,680,998 (Council, Jr.), the disclosure of which is incorporated herein by reference, and various methods are known for producing toric contact lenses.

U.S. Pat. No. 3,079,737 (Kratt et al.) relates to a toric lens tool for holding a lens blank on which a toric surface is machined. A toric surface is generated on the lens blank by a method comprising: warping (or "crimping") the lens blank by imparting diametrically opposed forces to peripheral portions of the lens blank; lathe cutting a spherical base curve in the convex posterior surface of the warped lens blank and polishing the base curve while the blank remains oblately distorted; and releasing the lens blank from the tool, whereby the blank returns to its original shape and the base curve assumes a toric shape.

This crimping method requires individually crimping and lathe cutting each lens blank to generate the desired toric surface, which is time consuming and labor intensive especially for the production of large quantities of lenses. Further, the reproducibility and consistency of the toric surface is entirely dependent on the individual crimping operation.

U.S. Pat. No. 5,110,278 (Tait et al.) relates to a method of injection molding a toric lens casting mold which includes a hollow, cup-like top portion having a toric surface. Lens buttons having a precision toric base curve and a generally flat front surface are molded in the cup-like top portion of the mold arbor. The toric surface of the cup-like top portion is formed upon injection molding from a toric core pin which has a concave toric end surface. Subsequent to molding the button with the toric lens surface, the other lens surface is lathe cut from the generally flat front surface. The patent discloses that the toric surface on the toric core pin may be produced by known manufacturing procedures, including lathe machining followed by polishing, electroforming, or electro discharge machining followed by polishing.

SUMMARY OF THE INVENTION

In one aspect, the present invention relates to an improved method for generating a toric surface on a molding tool.

The method comprises:

(a) providing a tool which comprises an elongated body and a molding portion at one end of the tool, wherein the molding portion comprises a surface which is substantially spherical;

(b) applying a force to the elongated body so as to distort the spherical surface of the molding portion;

(c) machining a substantially spherical curve in the distorted surface while maintaining the applied force; and (d) releasing the applied force, wherein the spherically cut surface assumes a toric shape upon release of the applied force.

In another aspect, the invention relates to an assembly for carrying out the method for generating a toric surface on a molding tool, including the molding tool on which the toric surface is generated. The molding tool can be employed for reproducibly forming toric molding surfaces of consistent quality on a relatively large number of plastic molds in which toric contact lenses are molded.

DESCRIPTION OF PREFERRED EMBODIMENTS

FIGS. 1 to 5 illustrate a molding tool and collet assembly according to preferred embodiments of the invention.

Figure 1:
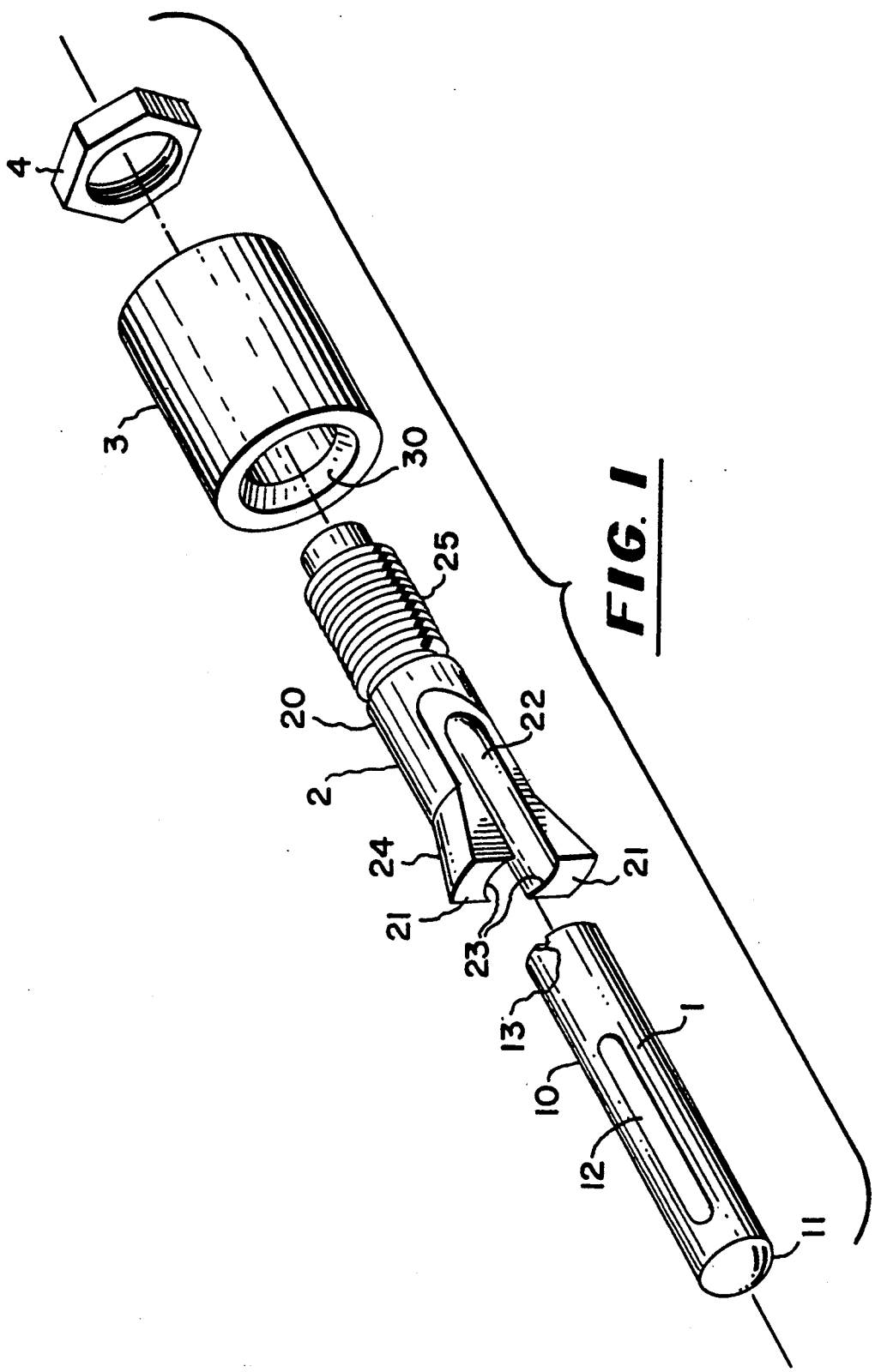
FIG. 1 is an exploded perspective view of a collet assembly and a molding tool according to a preferred embodiment.
Figure 2:
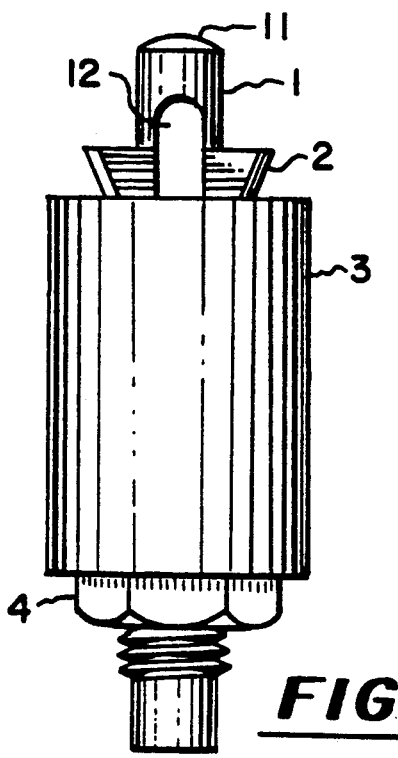
FIG. 2 is a side view of the collet assembly and tool shown in FIG. 1 assembled for carrying out the method of the present invention.

Referring to FIG. 1, tool 1 comprises an elongated body comprising cylindrical shell 10 and a curved surface at the upper end of the tool. Cavity 12 extends transversely through cylindrical shell 10. The curved surface at the upper end of the tool forms the molding portion 11 of the molding tool. The collet assembly, comprised of collet 2, sleeve 3 and drawing nut 4 in the illustrated preferred embodiment, can be used to generate a toric surface on molding portion 11 of the molding tool.

The finished molding tool having a toric molding surface may be used in conventional methods to form a toric optical molding surface on plastic contact lens molds. For example, the tool can be employed as an injection molding pin for the injection molding of multiple plastic contact lens mold. For tool 1 shown in FIG. 1, convex molding surface 11 would be used to form a concave surface on the plastic contact lens molds. In turn, contact lenses or contact lens blanks having a toric optical surface are formed in the contact lens molds by conventional methods such as static casting or centrifugal casting. For the alternate embodiment shown in FIG. 5, tool 1' having a concave molding surface 11' would be used to form a convex surface on plastic contact lens molds.

The tool may be used in other applications relating to the production of toric contact lenses. For example, metal replica tools may be made by electroforming from the finished tool, whereby the replica tools are used to form the plastic contact lens molds.

Figure 3:
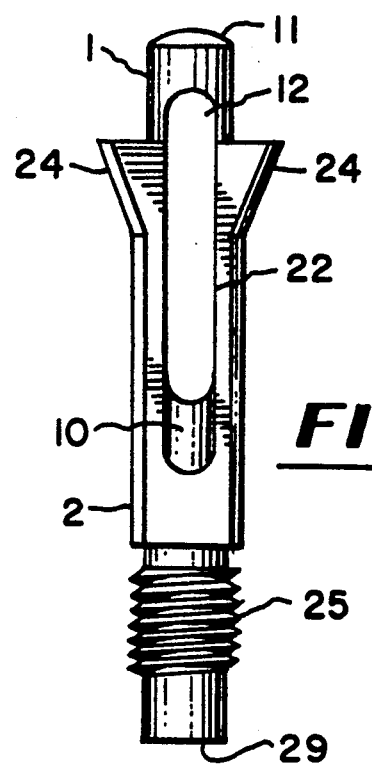
FIG. 3 is a side view of the tool and the collet shown in FIGS. 1 and 2.

Collet 2 comprises base 20 and a pair of diametrically opposed arms 21 extending longitudinally from base 20. Arms 21 are designed to receive and support cylindrical shell 10 of tool 1. Arms 21 are circumferentially separated from each other by a pair of longitudinally extending diametrically opposed spaces 22. As illustrated in FIG. 3, spaces 22 can be aligned with cavity 12 when the tool is received in the collet. The central cavity in which tool 1 is received and supported is defined by arcuate interior surfaces 23 of arms 21. The distal ends of arms 21 comprise tapered portions 24 such that a thickness of tapered portions 24 increases towards the distal ends.

The collet assembly further comprises tightening means for forcing the distal ends of arms 21 toward each other. For the described preferred embodiment, the tightening means comprises collet sleeve 3 which is slideable along a longitudinal axis of collet 2. Sleeve 3 comprises contacting surface 30 for contacting tapered portions 24 and thereby forcing the distal ends of arms 21 towards each other. As illustrated in FIG. 1, surface 30 is preferably a frustoconical tapered surface on the interior of the sleeve, wherein the frustoconical surface is tapered to correspond with tapered surfaces 24. Base 20 of collet 2 may be provided with threaded portion 25 for engaging drawing nut 4 so that the collet can be drawn against the sleeve by tightening the drawing nut.

Figure 4:
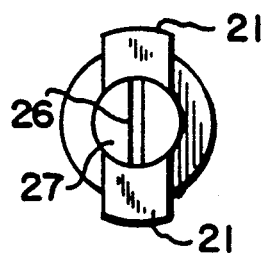
FIG. 4 is a top view of the collet shown in FIGS. 1 to 3.
Figure 5:
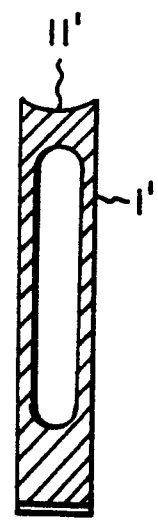
FIG. 5 is a sectional view of an alternate embodiment of the tool.

Tool 1 and collet 2 can be provided with locking means for preventing independent rotation of a tool supported in the collet. As illustrated in FIG. 4 for the described preferred embodiment, transverse bar 26 can be provided in the lower end of central cavity 27 of collet 2, and a corresponding transverse slot 13 (FIG. 1) can be provided at the lower end of tool 1. Bar 26 and slot 13 are arranged so that when they are engaged, cavity 12 aligns diametrically with the pair of longitudinally extending diametrically opposed spaces 22 of collet 2 as illustrated in FIG. 3.

Preferably, lower end 29 of the collet includes means for mounting the collet on a spindle of a lathe apparatus or a spindle of a polisher. For example, lower end 29 can include a non-threaded portion for mounting the lower end on a lathe spindle, and a tapered central hole can be provided in the lower end for mounting the collet on a spindle of a polisher. It will be appreciated that various modifications can be made depending on the specific finishing apparatus on which the collet is to be mounted.

An embodiment of carrying out the method of this invention will now be described with reference to the described preferred embodiment of a molding tool and collet assembly.

Molding tool 1 is inserted in collet 2, and cavity 12 of the tool is aligned with spaces 22 of the collet as illustrated in FIG. 3. Subsequently, sleeve 3 and nut 4 are placed on collet 2 such that the assembly resembles the configuration illustrated in FIG. 2.

Molding portion 11 is initially provided with a substantially spherical surface. This spherical surface can constitute the entirety of molding portion 11, or, alternately, this spherical surface can form a central zone of molding portion 11 wherein the remainder of portion 11 is formed by at least one concentric zone. The concentric zone can also be substantially spherical with a radius of curvature different than the radius of curvature of the central zone.

The drawing nut is tightened, and due to contact between surface 30 of the sleeve and tapered surfaces 24 of arms 21, the ends of the arms are forced toward each other and diametrically opposed forces are exerted on cylindrical shell 10 of the tool. This action compresses the cylindrical shell and oblately distorts molding portion 11. The alignment of cavity 12 and spacings 22, such that the forces are applied to portions of the cylindrical shell separated by this cavity, facilitates the distortion of molding portion 11 during this step. The tightening of nut 4 is ceased when molding portion 11 obtains a desired distortion, and the distortion can be measured with a conventional precision instrument, such as an interferometer or a radius scope. Standard antirotation means may be provided to inhibit rotation of the collet with respect to the sleeve. For example, a longitudinal slot may be provided in threaded portion 25 in which a key can be inserted.

While the tool is maintained at the desired distortion, the assembly is mounted on a spindle of a lathe apparatus and a spherical curve is lathe cut on molding portion 11. Although it is preferred that a spherical curve is cut on the entire molding portion 11, it will be appreciated by one skilled in the art that the spherical curve may be cut on only a section of the molding portion, such as the central zone thereof, depending on the desired final shape of the molding portion. Subsequently, molding portion 11 can be polished to an optically smooth quality. As used herein, the term "optically smooth" connotes a surface which is sufficiently smooth for the molding of an optical surface, such as the optical molding surface of contact lens molds. Subsequently, the assembly is disassembled and the tool is released from the collet, whereby the molding portion returns to its original shape and, consequently, the spherically cut section of the tool assumes a toric shape. Optionally, a section of the molding portion can be further machined to a desired shape, such as bevelling the perimeter of the molding portion.

Each of tool 1, collet 2, sleeve 3 and nut 4 may be formed from stainless steel and precision machined using known techniques. Although these precision machining operations can be time consuming, and some trial and error may be required initially to optimize the distortion of the molding portion, one finished molding tool can be used to reproducibly manufacture a relatively large number of contact lens molds, or replica tools, having toric molding surfaces of consistent quality. Further, when it is eventually necessary to replace the molding tool, the collet assembly can be reused.

As apparent to one skilled in the art, the degree of toricity ultimately generated on the tool surface, which provides the desired cylindrical correction of a toric contact lens surface, is relatively minor, i.e., the extent that the imparted toricity deviates from a spherical curve is generally not detectable by the human eye. Therefore, although stainless steel may not be thought of as a shape memory alloy, it has been found that the molding portion of the tool returns sufficiently to its original configuration upon release of the applied forces to impart the desired toricity to the spherically cut section.

Although preferred embodiments of the invention have been described in detail, it will be understood by those skilled in the art that variations are within the concept of the invention.

What is claimed is:

1. A method for generating a toric surface on a molding tool comprising:
    (a) providing a tool which comprises an elongated body and a curved molding portion at one end of the tool, said molding portion comprising a surface which is substantially spherical;
    (b) applying a force to said elongated body so as to distort the substantially spherical surface of the molding portion;
    (c) machining a substantially spherical curve in the distorted surface while maintaining the applied force to obtain a substantially spherically cut surface; and
    (d) releasing the applied force, wherein the spherically cut surface assumes a toric shape upon release of the applied force.

2. The method of claim 1, wherein step (c) further comprises polishing the molding portion to obtain an optically smooth surface.

3. The method of claim 1, wherein the molding portion of the tool is convex.

4. The method of claim 1, wherein the molding portion of the tool is concave.

5. The method of claim 1, wherein step (b) comprises applying diametrically opposed forces to said elongated body.

6. The method of claim 5, wherein the elongated body is cylindrical.

7. The method of claim 6, wherein the elongated body comprises a cylindrical shell including a cavity extending transversely through said cylindrical shell.

8. The method of claim 6, wherein the forces are applied to portions of said cylindrical shell separated circumferentially by said cavity.

9. The method of claim 8, wherein the molding portion of the tool is convex.

10. The method of claim 8, wherein the molding portion of the tool is concave.

* * * * *

UNITED STATES PATENT AND TRADEMARK OFFICE
CERTIFICATE OF CORRECTION

PATENT NO. : 5,269,105
DATED : December 14, 1993
INVENTOR(S) : Richard J. Fleenor It is certified that error appears in the above-indentified patent and that said Letters Patent is hereby corrected as shown below:

On title page, item [75] delete "; Kenneth L. Opdyke, Fairport, both of".

Signed and Sealed this

Fourteenth Day of June, 1994

Attest:

BRUCE LEHMAN

*Attesting Officer*  *Commissioner of Patents and Trademarks*